United States Patent

Ono et al.

[11] Patent Number: 5,278,001
[45] Date of Patent: Jan. 11, 1994

[54] HYDROGEN STORAGE ALLOY, ELECTRODE COMPRISING THE SAME AND HYDROGEN STORAGE ALLOY CELL

[75] Inventors: Hiroaki Ono, Ibaraki; Shuichi Wada, Osaka; Masayuki Hirota, Osaka; Hiroshi Fukunaga, Osaka, all of Japan

[73] Assignee: Hitachi Maxell, Ltd., Ibaraki, Japan

[21] Appl. No.: 7,983

[22] Filed: Jan. 22, 1993

[30] Foreign Application Priority Data

Jan. 24, 1992 [JP] Japan ................ 4-034204
Jun. 3, 1992 [JP] Japan ................ 4-170151

[51] Int. Cl.⁵ ........................... H01M 4/38
[52] U.S. Cl. ........................... 429/101; 429/223; 429/218; 420/900
[58] Field of Search ........... 429/223, 224, 218, 101, 429/57, 94, 206; 420/900, 422; 252/182.1

[56] References Cited

U.S. PATENT DOCUMENTS

| | | | |
|---|---|---|---|
| 4,082,834 | 4/1978 | Grossman et al. | 420/422 X |
| 4,412,982 | 11/1983 | Wallace et al. | 420/422 X |
| 4,728,586 | 3/1988 | Venkatesan et al. | 429/101 X |
| 4,898,794 | 2/1990 | Doi et al. | 420/900 |
| 4,983,474 | 1/1991 | Doi et al. | 420/900 X |
| 5,096,667 | 3/1992 | Fetcenko | 429/101 X |
| 5,205,985 | 4/1993 | Seri et al. | 420/900 X |

FOREIGN PATENT DOCUMENTS

| | | |
|---|---|---|
| 60-241652 | 5/1984 | Japan. |
| 0293660 | 12/1988 | Japan. |
| 0342654 | 11/1989 | Japan. |
| 4026732 | 5/1990 | Japan. |

*Primary Examiner*—Anthony Skapars
*Attorney, Agent, or Firm*—Birch, Stewart, Kolasch & Birch

[57] ABSTRACT

A hydrogen storage alloy of Ni, Zr, Mn, Ti and at least one other element and at least two phases including a phase which contains at least one kind of Laves structure intermetallic compound, in which when atomic ratios of Ni, Zr, Mn and Ti are "a", "b", "c" and "d", respectively, "a" is larger than "b", "b" is larger than "c", "c" is larger than "d", and "d" is larger than the atomic ratio of at least one other element, and a ratio b/a is larger than $\frac{1}{2}$, a ratio c/a is smaller than 11/20 and a ratio d/a is smaller than 2/5, which alloy is useful as an active material of a negative electrode of a hydrogen storage alloy cell.

5 Claims, 1 Drawing Sheet

HYDROGEN STORAGE ALLOY, ELECTRODE COMPRISING THE SAME AND HYDROGEN STORAGE ALLOY CELL

BACKGROUND OF THE INVENTION

1. Field of the Invention

The present invention relates to a hydrogen storage alloy which can electrochemically absorb and desorb hydrogen, an electrode comprising the alloy as an active material and a cell comprising the electrode.

2. Description of the Related Art

Since a nickel-cadmium cell which is widely used as one of alkaline cells uses cadmium as a negative electrode active material, environmental pollution caused by cadmium is being accused. Then, a new type cell which causes less pollution and can be used as a substitute cell for the nickel-cadmium cell is desired.

In order to make electronic devices small and cordless, a small secondary cell having a large capacity is required.

In view of these requirements, a nickel-metal hydride cell comprising a hydrogen storage alloy as a negative electrode material has been extensively studied.

As the hydrogen storage alloy, Ti-Ni alloy systems, Zr-Mn alloy systems and rare earth-Ni alloy systems are well known.

While the Ti-Ni alloy system and Zr-Mn alloy system have a comparatively larger capacity, they do not have sufficient properties at a high rate discharge, or their discharge at low temperatures around $-20°$ C. is difficult.

Since the rare earth-Ni alloy system has a smaller capacity than the Ti-Ni alloy system or Zr-Mn alloy system, the nickel-metal hydride cell using the rare earth-Ni alloy system has only the same weight energy density as the high capacity nickel-cadmium cell, and it is required to increase its capacity and energy density.

To increase the capacity and energy density of an alkaline cell, it is necessary to increase the energy density of at least one of positive and negative electrodes. Insofar as nickel hydroxide is used in the positive electrode of the nickel-metal hydride cell, it is difficult to increase the energy density of the positive electrode greatly. Therefore, it is essential to increase the capacity and energy density of the negative electrode.

To obtain a hydrogen storage alloy, usually at least one element which can be bonded with a larger amount of hydrogen and at least one element which imparts reversibility to the bonding of hydrogen with the element, namely at least one element which makes it possible to desorb hydrogen are combined, in order to reversibly absorb and desorb hydrogen. As the elements which are easily bonded with hydrogen, Zr and Ti are selected, and as the elements which make it possible to desorb hydrogen, Ni and Mn are selected, whereby an alloy forming a Laves structure intermetallic compound is obtained (see, for example, Japanese Patent Kokai Publication Nos. 241652/1985 and 26732/1992).

Ni acts as a catalyst on the alloy surface and improves a rate of electrochemical absorption and desorption of hydrogen, namely the discharge property. Zr contributes to the absorption of hydrogen and has great influence on basic properties of the hydrogen storage alloy such as an amount of absorbed hydrogen, an equilibrium pressure of hydrogen, and the like.

However, the conventional hydrogen storage alloys do not necessarily have satisfactory properties, tend to ignite in the air and have unsatisfactory shapability in the production of electrode.

SUMMARY OF THE INVENTION

One object of the present invention is to provide a novel hydrogen storage alloy which can absorb a larger amount of hydrogen than ever.

Another object of the present invention is to provide an electrode which is suitable as a negative electrode of a hydrogen storage alloy cell and has a good discharge property at a high rate at low temperatures and less self-discharge.

A further object of the present invention is to provide a hydrogen storage alloy cell having a high capacity and a high energy density.

According to a first aspect of the present invention, there is provided a hydrogen storage alloy comprising Ni, Zr, Mn, Ti and at least one other element and at least two phases including a phase which comprises at least one kind of Laves structure intermetallic compound, wherein when atomic ratios of Ni, Zr, Mn and Ti are "a", "b", "c" and "d", respectively, "a" is larger than "b", "b" is larger than "c", "c" is larger than "d", and "d" is larger than the atomic ratio of at least one other element, and a ratio b/a is larger than $\frac{1}{3}$, a ratio c/a is smaller than 11/20 and a ratio d/a is smaller than 2/5.

According to a second aspect of the present invention, there is provided an electrode comprising a support at least surface of which is made of nickel and a layer comprising a hydrogen storage alloy of the present invention.

According to a third aspect of the present invention, there is provided a hydrogen storage alloy cell comprising a negative electrode which comprises a support at least surface of which is made of nickel and a layer comprising a hydrogen storage alloy of the present invention, a positive electrode, a separator provided between the negative electrode and the positive electrode, and an electrolyte solution which wets the negative and positive electrodes and the separator.

DETAILED DESCRIPTION OF THE INVENTION

Figure 1:
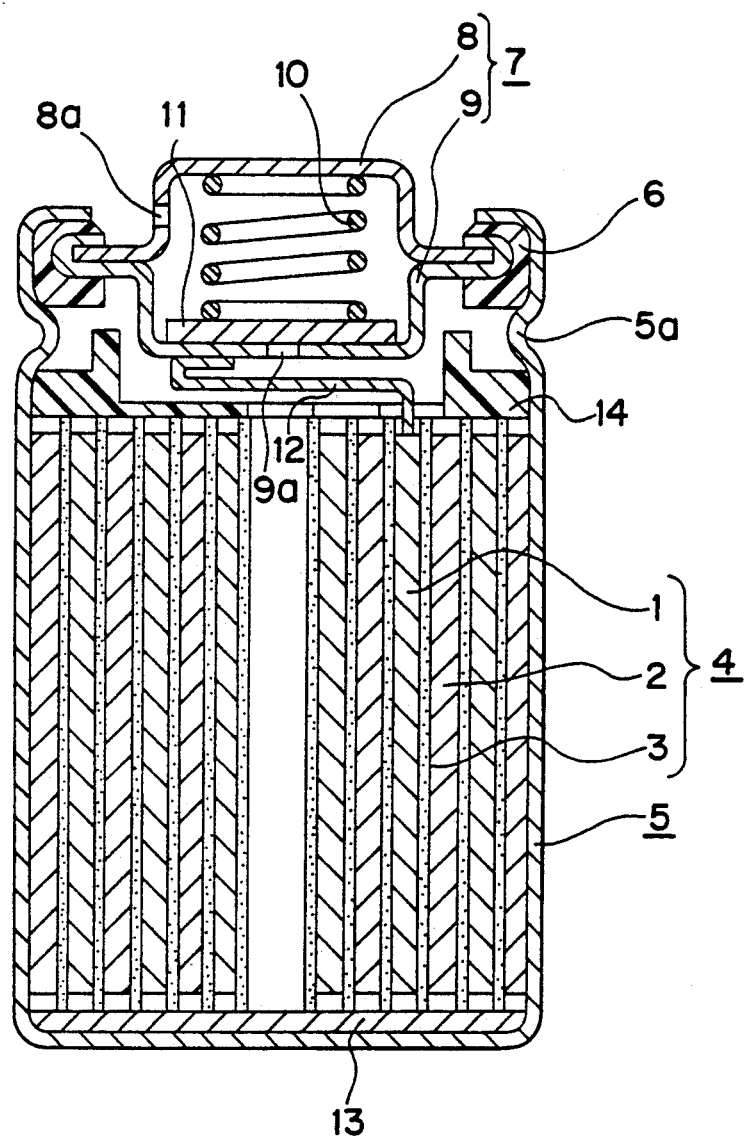
FIG. 1 is a cross sectional view of a cell according to the present invention.

According to the present invention, the alloy includes not only the Laves phase but also a phase comprising Ni, Zr and Ti, and the atomic ratio (a) of Ni is larger than the atomic ratio (b) of Zr, namely a>b, whereby precipitated amounts of the latter phase is controlled in a desired range during the preparation of the alloy, and dissolution of Zr in the electrolyte solution is suppressed so that a cycling property is improved.

In addition, when the ratio b/a is larger than $\frac{1}{3}$, namely b/a>$\frac{1}{3}$, the hydrogen storage alloy has the equilibrium pressure of hydrogen and its temperature characteristics particularly suitable for the negative electrode active material, and the amount of absorbed hydrogen increases.

Together with Zr, Mn contributes to the formation of the Laves structure intermetallic compound which constitutes the main phase of the hydrogen storage alloy and stabilizes a crystal structure of the Laves phase.

Then, the equilibrium pressure of hydrogen, an amount of hysteresis thereof and the amount of absorbed hydrogen largely depend on the contents of Mn and Zr. When the atomic ratio (b) of Zr is larger than the atomic ratio (c) of Mn, namely b>c, the equilibrium pressure of hydrogen can be adjusted in a range suitable for the negative electrode active material, for example in a range between 0.1 to 3 atm. at 30° C., and an amount of absorbed hydrogen can be increased in this pressure range. In addition, since the hysteresis in the cycle of absorption and desorption of hydrogen can be reduced, a discharge rate is improved when the alloy is used as the electrode and the discharge capacity of the alloy can be increased.

In addition, when the ratio c/a is smaller than 11/20, namely c/a<11/20, dissolution of Mn in the electrolyte solution is suppressed so that the cycling property and self-discharge characteristics are improved. Further, the shapability of the alloy in the formation of an electrode is improved.

The present invention makes it clear that, like Zr, Ti relates to the absorption of hydrogen, and combination of Ti and Zr can improve temperature characteristics of the equilibrium pressure of hydrogen of the Laves structure intermetallic compound and decrease hysteresis thereof. In addition, these metals form oxides on the alloy surface to improve oxidation resistance of the alloy powder. The properties of the oxides depend on the contents of Ti and Mn. That is, when the atomic ratio (c) of Mn is larger than the atomic ratio (d) of Ti, namely c>d, the oxide film is formed on the alloy surface so sparsely that the catalyst action of Ni is not interfered, and an amount of nitrogen trapped from the air as an impurity is decreased.

When the ratio d/a (Ti/Ni) is smaller than 2/5, namely d/a<2/5, a thickness of the oxide film is suitably adjusted so that the alloy powder has good catalyst function and oxidation resistance.

The hydrogen storage alloy of the present invention comprises at least two phases, one of which is the Laves phase. Because of the presence of plural phases in the alloy, the alloy has excellent discharge property and the cycling characteristics and suppresses ignition in the air. In addition, falling off of the alloy particles from the electrode is prevented.

Hitherto, research has been made to provide a single Laves phase hydrogen storage alloy, while the present invention intends to form plural phases in the alloy. Whether the alloy is the single phase one or has the plural phases depends on the ratios of the component metal elements and their balance. Therefore, a slight difference of the amount of each metal changes the number of the phases to be deposited and their ratios.

According to the present invention, it has been found that the alloy having the plural phases has better discharge property and prevents ignition in the air and falling off of the alloy powder from the electrode more effectively than the single phase alloy. A reason for such effects of the hydrogen storage alloy of the present invention has not be found. The following reasons may be assumed: (1) Since many grain boundaries are present, a diffusion rate of hydrogen in the particles is increased, so that the discharge property and cycling characteristics are improved.

(2) Phases containing a relatively large amount of Ni are precipitated as second and subsequent phases, and such phases act as a catalyst on the Laves phase to improve the discharge property.

(3) Since the second or subsequent phases separate or partly cover the Laves phases which are easily ignited, the ignition of the alloy is prevented.

(4) If a phase having a melting point lower than that of the Laves phase is precipitated, it acts as a binder which bonds the particles when the electrode is sintered so that strength of the sintered body is maintained and the falling off of the alloy particles is prevented.

From the above reason (1), it is preferably that the Laves phase itself consists of plural phases rather than the single phase (for example, coexistence of C14 type Laves phase and C15 type Laves phase). In the alloy of the present invention, the Laves phase consists of plural phases in a wide composition range.

In order to further improve the discharge capacity, the discharge property at a high rate and low temperature and the self-discharge property of the alloy, it is preferred to add at least one other element to the alloy. Examples of the other element are vanadium (V), cobalt (Co), chromium (Cr), molybdenum (Mo), and the like.

V increases the amount of absorbed hydrogen in the alloy and then the discharge capacity of the electrode. When V is used in combination with Cr, a phase comprising these two elements mainly may be precipitated.

When Co is used in combination with Mn, the discharge property at a high rate and low temperature is improved.

Cr and Mo improve the oxidation resistance of the alloy and also the self-discharge property.

Though these other elements may be used independently, they will provide the alloy with better properties when two or more of them are used in combination.

An amount of the other element or elements should be less than the amount of Ti. Depending on the amount of the other element or elements, an amount of the second and subsequent phase deviates from the suitable range, or the equilibrium pressure of hydrogen in the alloy deviates from the preferred range.

When the amount of V is too large, it will be dissolved in the electrolyte and the self-discharge property is deteriorated suddenly. When the amount of Co is too large, a pressure in the cell during charging increases too high or cobalt dissolved in the electrolyte forms an oxide film on the separator surface, whereby the functions of the separator such as water retention or insulation properties are deteriorated. When the amount of Cr is too large, the discharge property greatly decreases at low temperature. When the amount of Mo is too large, the amount of absorbed hydrogen decreases.

The hydrogen storage alloy of the present invention not only has the good properties of the suppression of ignition and good shapability, but also achieves the high capacity and high energy density of the hydrogen storage alloy cell.

For example, in the case of a U3 size (AA size) nickel-metal hydride cell having a capacity of 1100 mAh, the capacity of the positive electrode is from about 1120 to about 1200 mAh, and that of the negative electrode is about 1.5 times the capacity of the positive electrode in view of the cycle life. Then, the discharge capacity of the negative electrode is about 270 mAh per one gram of the alloy. To produce a cell of the same size having the capacity of 1300 mAh, a high capacity alloy which has a discharge capacity of at least 380 mAh per one gram of the alloy or at least 2800 mAh per one cc is necessary.

According to the present invention, it is possible to provide the hydrogen storage alloy which can be used in such high capacity cell. Therefore, the present invention greatly contributes to the increase of capacity and energy density of the alkaline cell using the hydrogen absorption alloy as the negative electrode active material.

Such alkaline cell can be produced as follows:

The negative electrode is prepared by integrally compression molding the hydrogen storage alloy powder together with a porous metal material such as a metal mesh or an expanded metal sheet at least a surface of which consists of the element contained in the largest amount in the alloy as a support, and sintering a composite to form a sheet-form negative electrode. Separately, the positive electrode is prepared by filling a paste containing nickel hydroxide powder, a conductive aid, a binder, etc. in a porous metal sheet, drying and aging it and then adjusting a thickness. To the positive electrode, a collector terminal is attached. Then, the negative and positive electrodes are wound with a separator inserted made of a sheet of non-woven fabric of synthetic fibers to form a spirally wound electrode member. The electrode member is installed in a cell case, the electrolyte solution is poured in the case and an opening of the case is sealed. Then, it is subjected to an activation treatment and a chemical conversion treatment to complete the cell.

When at least the surface of the porous metal such as the metal mesh or the expanded metal consists of the same element as the element contained in the largest amount in the alloy, the hydrogen storage alloy and the support are easily bonded in the sintering step so as to establish a good conducting condition therebetween, whereby the properties of the electrodes are improved. Since the alloy of the present invention contains nickel in a larger amount than each of the other elements, it is preferable to use a metal mesh or an expanded metal at least a surface of which consists of nickel as the support. The alloy of the present invention is particularly suitable for the electrode having the above construction, since it has good shapability.

The hydrogen storage alloy of the present invention can be prepared as follows:

As raw materials, commercially available Ni, Zr, Mn, Ti and other metals are used. Preferably, a purity of the metal is at least 98 atomic %, for example, 98 to 99.9 atomic %. The raw material metals are mixed in a desired ratio and molten and alloyed in, for example, an argon arc furnace. Then, the alloy is annealed in an inert gas such as argon at a suitable temperature, for example, around 950° C. for a suitable time, for example, about 5 hours.

Now, the productions of the negative and positive electrodes, the separator, the electrolyte and the assembly of the cell will be explained further in detail.

1. Production of Negative Electrode

Preferably, the hydrogen storage alloy to be used as the negative electrode active material is a multiphase alloy such as the hydrogen storage alloy of the present invention. That is, when at least 50% by volume of the hydrogen storage alloy particles in the negative electrode is such multiphase alloy, the negative electrode has good properties. In particular, when the alloy is a three or higher phase alloy, the effects of the present invention are remarkable.

In the multiphase alloy, a content of the second and subsequent phases is preferably from 10 to 40% by volume.

When an average particle size of the hydrogen storage alloy is from 10 to 75 μm, the negative electrode has good properties.

An amount of an impurity element such as carbon atom or nitrogen atom is preferably less than 0.02% by weight, since such element generates methane or nitrogen gas in the cell to increase the internal pressure of the cell or deteriorates a long-term reliability of the cell. In the present invention, the content of Ti which tends to include such impurity element is made smaller than that of Mn so as to decrease the amount of carbon or nitrogen in the alloy.

When a carbon crucible is used to melt the raw materials in the production of the hydrogen storage alloy, a large amount of carbon is contained in the alloy. Therefore, a method for melting the raw materials should be carefully selected. The use of arc melting or an apparatus which is designed to reduce the carbon contamination is desired. In the present invention, since the content of Zr is made smaller than that of Ni and the content of Ti is decreased, the carbon contamination is not significant even when such apparatus is not used.

Since nitrogen comes from the air when the hydrogen storage alloy is powdered, the alloy is preferably powdered in a nitrogen-free atmosphere.

In order to increase the reactivity of the alloy powder to be used as the negative electrode active material, the alloy powder having a relatively large specific surface area is preferably used. In general, as the specific surface area increases and then the reactivity increases, the powder is easily ignited in the air. In the alloy of the present invention, the Laves phases are separated by or partly covered by the second and subsequent phases or the surfaces of alloy particles are covered with the metal oxide, whereby the ignition of the alloy powder is prevented.

Then, the hydrogen storage alloy powder is integrated with the porous metal support such as the metal mesh, the expanded metal, a punching metal, metal fibers and the like.

Preferably, the porous metal support has a thickness of 0.12 to 0.17 mm, mesh sizes of 1.1 to 1.5 mm in SW and 1.5 to 2.5 mm in LW, and a weight of 0.03 to 0.05 g/cm$^2$, and at least its surface consists of nickel which is the main metal of the hydrogen storage alloy of the present invention.

Among the porous metal supports, a nickel expanded metal is preferred.

In the integrated sheet-form negative electrode, a packing density of the hydrogen storage alloy (except the porous metal support) is from 5.2 to 5.7 g/cm$^3$. To this end, the integrated electrode is preferably roll pressed. With the hydrogen storage alloy of the present invention, the electrode having the above packing density is easily achieved.

In the above range of the packing density, the cell has good properties in which characteristics under load and the internal pressure during charging are well balanced.

A porosity of the negative electrode except the porous metal support is from 15 to 26% by volume, and a ratio of pores having a size of 1 to 20 μm is at least 40%.

After roll press, the negative electrode is heated and sintered in an inert gas atmosphere such as argon containing 5% by volume or less of hydrogen at a temperature of at least 800° C. and cooled to around room temperature. Since the surface of the porous metal support consist of the same metal as that contained in the largest amount in the hydrogen storage alloy, the alloy powder and the porous metal support are easily bonded so that a good conducting condition is achieved and the falling off of the alloy powder is prevented when the electrode is wound.

When the sintering atmosphere contains 5% by volume or less of hydrogen, oxidation of the surface of the negative electrode by oxygen in a sintering furnace is prevented, and an amount of hydrogen as a discharge reserve can be contained in the negative electrode. Thereby, an amount of hydrogen corresponding to the PCT characteristics (hydrogen-absorption and desorption characteristics) is contained in the negative electrode.

Preferably, the produced negative electrode is a sheet-form having a thickness of 0.2 to 0.4 mm and a packing density of 0.7 to 0.2 g/cm$^2$.

2. Production of Positive Electrode

A positive electrode to be combined with the negative electrode which is produced by the above method is produced as follows.

In pores of a porous nickel sheet as a support, a past of nickel hydroxide power as an active material, a conductive aid, a binder, a thickening agent and water is filled.

In view of the increase of discharge capacity, it is preferred to fill the support with as much nickel hydroxide powder as possible. To this end, preferably a fibrous nickel porous sheet having a porosity of 90 to 98% is used.

Such fibrous porous nickel sheet can be produced by plating surfaces of synthetic fiber non-woven fabric with nickel and removing the synthetic fibers by, for example, thermally decomposing the synthetic fiber in a reducing atmosphere. Such porous nickel sheet has the porosity of at least 90%, and the positive electrode comprising such porous nickel sheet has the discharge density of at least 550 mAh/cc.

To increase the packing density of the nickel hydroxide powder in the fibrous nickel porous sheet, the use of synthetic fiber non-woven fabric having a low fiber density may be contemplated. In this case, a relative distance between the support and the nickel hydroxide powder is increased so that a utilization of the active material during charge and discharge of the cell tends to decrease.

The nickel hydroxide powder to be used as the active material preferably has an average particle size of 3 to 25 μm. A pore size distribution of nickel hydroxide has a main peak around 6 Å and sub-peaks around 5, 8 and 10 Å. When the nickel hydroxide powder has a height ratio of the sub-peak to the main peak of at least 0.05, the packing density increases so that the cell has good characteristics under load.

When the nickel hydroxide powder particles contain zinc in an amount of 0.5 to 10% by weight, swelling of the positive electrode due to charge and discharge cycles is suppressed and a charging efficiency at high temperature is increased.

Further, the nickel hydroxide powder particles may contain cobalt together with zinc. An amount of cobalt is preferably from 0.05 to 30 times that of zinc.

Since the nickel hydroxide powder itself has poor conductivity, it preferably contains metal nickel powder as the conductive aid. Preferably, the metal nickel powder has an average particle size of 0.5 to 3 μm.

The metal nickel powder facilitates the electrical continuity between the nickel hydroxide power and the fibrous nickel porous sheet.

In addition to the metal nickel powder, as a co-conducting aid, other metal powder is preferably used since the metal nickel powder is changed to nickel hydroxide after the charge and discharge cycles so that its conductivity decreases and finally it does not function as the conducting aid. Therefore, the co-conducting aid should not suffer from such change. A preferred example of the co-conducting aid is cobalt powder having an average particle size of 0.5 to 3 μm.

An amount of the conducting aid is preferably from 5 to 20 parts by weight per 100 parts by weight of nickel hydroxide. When the metal nickel powder and the metal powder other than metal nickel are used in combination, an atomic ratio of the metal nickel powder to the other metal is 3 or less. In this atomic ratio range, the utilization of the active material is improved so that the discharge capacity of the cell is increased.

The conducting aid and the nickel hydroxide powder are dry mixed and then mixed with an aqueous solution of sodium salt of carboxymethylcellulose and an aqueous dispersion of polytetrafluoroethylene powder to obtain a negative electrode active material paste. By this mixing sequence, the powders are better dispersed and the higher utilization is achieved than when the nickel hydroxide powder and the conducting aid are directly added to the aqueous solution of the sodium salt of carboxymethylcellulose.

The polytetrafluoroethylene powder is preferably fibrillated. The polytetrafluoroethylene powder can be fibrillated by throughly mixing the positive electrode active material paste.

Using the fibrillated polytetrafluoroethylene powder, the falling off of the positive electrode active material can be prevented when the positive electrode is wound at a curvature radius of about 1.5 mm or smaller even if a thickness of the positive electrode is 0.9 mm or less.

After the filling or coating of the positive electrode paste in or on the fibrous nickel porous sheet, the positive electrode is dipped in an alkaline solution and heated, whereby the utilization can be improved and the swelling of the positive electrode due to the charge and discharge cycles can be suppressed to 25% or less.

Since cobalt is dissolved in the alkaline solution by the heating step and the solute covers the whole surface of the materials constituting the positive electrode, a film of cobalt oxyhydroxide having comparatively good conductivity is formed on the surface of the positive electrode. As the result, the cell has larger discharge capacity and density.

As the aqueous alkaline solution in which the positive electrode is dipped, an aqueous solution of potassium hydroxide, sodium hydroxide or lithium hydroxide is preferably used. Preferably, a concentration of the alkaline solution is from 5 to 40% by weight.

A heating temperature is preferably from 40° to 100° C. For the formation of the film of cobalt oxyhydroxide, a heating time is at least 0.1 hour, and for the growth of the film, heating for 20 hours or shorter is sufficient.

By such treatment, 50% by weight or more of metal cobalt contained in the paste is converted to cobalt oxide or hydroxide before the assembly of the cell and the conductive coating is well formed, whereby the utilization during discharge is improved.

After the above treatment, the past type positive electrode has a color from brown to black, a resistivity of 25 Ω.cm or less in the thickness direction when measured by contacting a pair of SUS discs each having a diameter of 37 mm to respective surfaces of the positive electrode and measuring the resistance between the discs with applying a pressure of 1 kg/cm². Further, the positive electrode has an equilibrium voltage of 0 volt or higher in comparison with a mercury/mercury oxide reference electrode in a 30 wt. % aqueous solution of potassium hydroxide containing 17 g/l of dissolved lithium hydroxide.

The cell comprising the above paste type positive electrode achieves a very high utilization of 90% or higher of the charge capacity from the first charge and discharge cycle. The charge capacity after the chemical conversion increases to 1100 mAh or larger in the AA cell.

At one longitudinal end part of the sheet-form positive electrode on which no active material is provided and which part has a width of 4 mm and is compressed to a thickness of 0.2 mm, a nickel ribbon collector is attached. For example, the collector has a length of 50 mm, a width of 3 mm and a thickness of 0.1 mm.

The ribbon collector may be attached to the positive electrode by any conventional method. For example, welding, in particular, spot welding is preferred. In spot welding, when a ratio of a welding diameter to the area of the positive electrode is from 0.00015 to 0.00063/mm and a total area of the welded parts is at least 0.4 mm², good connection is formed between the collector and the positive electrode.

By the selection of the above conditions, the weld strength of the positive electrode to the collector is sufficient, an accuracy of positioning during welding is easily controlled, a total weld area is sufficient, an electrical resistance is made small, for example, in the case of an AA cell, an impedance is made less than 40 mΩ at 1 kHz, and good discharge characteristics are achieved.

The spot welding is preferably started from a part near an upper edge in an area within 5% of the height of the positive electrode from the upper edge, because such spot welding of the collector to the positive electrode can prevent the formation of short circuit when the collector is bent in a step for connecting the collector to a sealing plate of a sealing lid during the assembly of the cell.

3. Separator

As a separator, a non-woven fabric of synthetic fibers such as polyamide or polypropylene is preferably used, since such synthetic fibers liberate only a small amount of an eluted material, which has large influence on the self-discharge of the cell, in the electrolyte.

In particular, when a nitrogen-containing material is eluted, the cell tends to self discharge. Therefore, a separator material which liberates no or a very small amount of the nitrogen-containing material is preferably used. In this respect, the separator material showing one of the following properties is preferred for the good cell properties. That is, after the separator having an area of 1075 cm² is dipped in 100 ml of the electrolyte consisting of a 30 wt. % aqueous solution of potassium hydroxide containing 17 g/l of lithium hydroxide at 45° C. for 3 days, the electrolyte is substantially negative to the Nessler's reaction, or when a cyclic voltammetry is carried out using a mercury/mercury oxide electrode as a reference electrode and platinum electrodes as a work electrode and a counter electrode, an oxidation peak around −0.3 V is not larger than the specific value defined below.

That is, after the scanning is repeated three times at a scanning speed of 10 mV/sec. from −0.95 V to +0.65 V and the separator is held at −0.95 V for 30 minutes, the oxidation peak around −0.3 V is not larger than 100 μA/cm², preferably not larger than 20 μA/cm².

A total nitrogen content in the separator is not larger than 500 ppm, preferably not larger than 200 ppm. Even if the nitrogen content exceeds 700 ppm, the self-discharge can be suppressed at a low level by the use of the hydrogen storage alloy of the present invention.

4. Electrolyte Solution

As the electrolyte solution, an aqueous solution of potassium hydroxide, sodium hydroxide or their mixture is preferably used. A concentration of potassium hydroxide, sodium hydroxide or their mixture is preferably from 25 to 35% by weight.

When the electrolyte solution contains 20 g/l or less of lithium hydroxide, the charge-discharge property of the cell is improved.

5. Assembly of a Cell

The obtained positive and negative electrodes are spirally wound by inserting the separator therebetween and the negative electrode forms the outermost layer so that the electrode contacts to and is electrically conductive with an inner wall of a cell case. Then, the spirally wound electrodes are inserted in the cell case, the electrolyte solution is poured in the cell case, and an opening of the cell case is sealed with a sealing lid to finish the assembly of the cell. Since an inner surface of the cell case is made of nickel which is the main metal component of the hydrogen storage alloy of the present invention, electrical conductivity between the negative electrode and the cell case is good.

Not only a design of the cell but also the packing amounts in the negative and positive electrodes depend on the sizes of the negative and positive electrodes, and the sizes have direct influence on the cell properties.

In the industrial production of specific size cells, the sizes of the negative and positive electrodes are determined according to the packing amounts in the electrodes.

The packing amount is determined so that, when the utility of the packing amount of the positive electrode active material is 100%, a part of the fully charged negative electrode which faces the positive electrode has an equilibrium hydrogen pressure of 5 atm. or lower at 60° C. This is because the decrease of reliability of the cell caused by unnecessary increase of the internal pressure is prevented, in particular when the cell is quickly charged at about 1 CA.

When all the surface of the positive electrode faces the negative electrode having the specific thickness during winding, the internal pressure is suppressed to a low pressure. Preferably, a ratio of a thickness of the positive electrode to that of the negative electrode is from 1 to 2.

The discharge reserve can be obtained by adjusting an irreversible rate of the positive electrode in the first charging step.

In general, the assembled cell is stabilized by the activation and chemical conversion. The activation is usually carried out by keeping the cell at a temperature of 45° to 80° C. for 12 to 120 hours. When the hydrogen storage alloy of the present invention is used, the activation can be carried out at a low temperature of 45° to 65° C. in a short time period of 10 to 20 hours.

By the activation, the negative electrode has the BET surface area of about 1.5 $m^2/g$ or larger, whereby a total characteristics of the cell is improved.

The chemical conversion is carried out by repeating charge and discharge several times. In particular, when the cell is overcharged by 2 to 5 times the cell capacity in the first and second charge steps, an intended capacity is quickly achieved. When the hydrogen storage alloy of the present invention is used, the overcharge of 1.5 times is sufficient.

Before the storage at high temperature, the cell is kept at a temperature of 0° to 40° C. for at least two days, whereby the distribution of the electrolyte solution in the cell is stabilized.

In addition, after the discharge in the chemical conversion treatment, a voltage of −0.2 V to +0.5 V is applied between the terminals of the cell for about one hour or the cell is forced to discharge down to about −0.2 V at a constant current of about 0.01 CA, whereby the low temperature characteristics of the cell is further improved. This may be because the oxide film on the negative electrode may be removed by such treatment.

In the chemical conversion treatment, the wound positive electrode swells in the thickness direction by 5 to 10%, and thereafter, the total degree of swelling in the subsequent charge-discharge cycles is suppressed to 25% or less of that before the charge and discharge.

An outer diameter of a spirally wound electrode member consisting of the positive electrode, the separator and the negative electrode is smaller than an inner diameter of the cell case so that the electrode member can be easily inserted in the cell case. Since the electrode member swells due to the addition of the electrode solution or the charge and discharge as described above, the outer periphery of the electrode member contacts to the inner wall of the cell case under a pressure of about 2 $kg/cm^2$ so that the collection effect is enhanced, whereby the discharge at the high current is made possible and the falling off of the electrode active materials is prevented.

PREFERRED EMBODIMENTS OF THE INVENTION

The present invention will be explained further in detail by the following Examples.

EXAMPLES 1–6 AND COMPARATIVE EXAMPLES 1–6

The raw material metals shown in Table 1 were molten and alloyed in an argon arc furnace and annealed in a reducing atmosphere at 950° C. for 5 hours to obtain an alloy having an atomic ratio shown in Table 1.

The alloys in Examples 1–6 were within the scope of the present invention, while those in Comparative Examples 1–6 were outside the scope of the present invention. That is, the alloy of Comparative Example 1 did not satisfy a>b, that of Comparative Example 2 did not satisfy b>c, that of Comparative Example 3 did not satisfy c>d, that of Comparative Example 4 was alloy disclosed in Japanese Patent Kokai Publication No. 241652/1985 having the too small b/a ratio, that of Comparative Example 5 was an alloy disclosed in Japanese Patent Kokai Publication No. 26732/1992 having too large c/a and d/a ratios, and that of Comparative Example 6 was an alloy in which Ti was not the fourth element.

TABLE 1

| Example No. | Alloy composition (mole) | | | | | | | | Ratio | | |
|---|---|---|---|---|---|---|---|---|---|---|---|
| | Ni | Zr | Mn | Ti | V | Co | Cr | Mo | b/a | c/a | d/a |
| 1 | 0.90 | 0.66 | 0.45 | 0.34 | 0.18 | 0.27 | | | 0.73 | 0.50 | 0.38 |
| 2 | 0.90 | 0.66 | 0.36 | 0.34 | 0.30 | 0.18 | 0.20 | 0.06 | 0.73 | 0.40 | 0.38 |
| 3 | 1.08 | 0.74 | 0.44 | 0.26 | 0.12 | 0.12 | | | 0.69 | 0.41 | 0.24 |
| 4 | 1.09 | 0.77 | 0.49 | 0.23 | 0.17 | 0.09 | 0.06 | | 0.71 | 0.45 | 0.21 |
| 5 | 1.00 | 0.78 | 0.46 | 0.22 | | 0.11 | 0.14 | | 0.78 | 0.46 | 0.22 |
| 6 | 1.06 | 0.83 | 0.47 | 0.17 | 0.10 | 0.10 | 0.06 | | 0.78 | 0.44 | 0.16 |
| C. 1 | 0.88 | 0.90 | 0.45 | 0.10 | 0.05 | 0.07 | | | 1.02 | 0.51 | 0.11 |
| C. 2 | 0.94 | 0.78 | 0.88 | 0.22 | 0.16 | 0.16 | | | 0.83 | 0.94 | 0.23 |
| C. 3 | 0.88 | 0.63 | 0.33 | 0.37 | 0.08 | 0.13 | 0.13 | | 0.72 | 0.38 | 0.42 |
| C. 4 | 1.20 | 0.70 | 0.60 | 0.30 | | | 0.20 | | 0.58 | 0.50 | 0.25 |
| C. 5 | 0.66 | 0.64 | 0.42 | 0.36 | 0.02 | 0.27 | | 0.07 (Fe) | 0.97 | 0.64 | 0.55 |
| C. 6 | 0.90 | 0.80 | 0.40 | 0.20 | 0.35 | 0.15 | | | 0.89 | 0.44 | 0.22 |

With a part of each of the alloys, the PCT characteristics was measured, its morphology was observed with a microscope and its X-ray diffraction pattern was recorded.

The hydrogen storage alloy of the present invention had a large amount of stored hydrogen at 30° C. under pressure of 0.1 to 3 atm. and comprised the Laves phase as a main phase, and the precipitation of other crystalline phases was controlled in the suitable range.

After the measurement of the OCT characteristics, ignitability of the powder of each alloy was measured. That is, after desorbing hydrogen from the sample alloy powder by evacuating a sample holder, about 2 g of the alloy powder (Powder A) was poured in a glass vessel (20 ml) in a glove compartment filled with argon, while the sample holder containing about 2 g of the remaining powder was sealed and then removed from the glove compartment. After evacuating the sample holder, an air of 0.01 atm. was introduced in the sample holder to exposed the alloy powder to the air of 0.01 atm and the sample holder was kept standing for one minute under this condition. Again the sample holder was evacuated, and the powder in the sample holder (Powder B) was transferred in a glass vessel (20 ml) in the above glove compartment.

After opening a lid of the glove compartment, the argon atmosphere was replaced with the air, and Powders A and B were exposed to the air. Whether or not the alloy powder ignited was observed. The results are shown in Table 2.

TABLE 2

| Example No. | Ignition Powder A | Powder B |
|---|---|---|
| 1 | No | No |
| 2 | No | No |
| 3 | No | No |
| 4 | No | No |
| 5 | Yes | No |
| 6 | No | No |
| Comp. 1 | Yes | Yes |
| Comp. 2 | Yes | Yes |
| Comp. 3 | Yes | No |
| Comp. 4 | Yes | Yes |
| Comp. 5 | Yes | Yes |
| Comp. 6 | Yes | No |

The ignition of the alloys of the present invention is well suppressed, and the alloys can be handled in the air with or without a slow oxidation treatment of the alloy surface.

Using the remaining ingot of each alloy, a negative electrode was produced as follows:

After repeating the hydrogen absorption and desorption with the alloy ingot two times, the ingot was ground in a ball mill and classified to a particle size of 10 to 75 µm with an average particle size of 45 µm. These procedures were carried out in an argon atmosphere.

The above hydrogen storage alloy powder and a nickel expanded metal having a body material thickness of 0.15 mm, a mesh size of 1.3 mm in SW and 2.0 mm in LW and a weight of 0.037 g/cm² were supplied simultaneously and compressed integrally by a roll mill to obtain a sheet-form negative electrode having a thickness of 0.30 mm and a packing density of the hydrogen storage alloy of 5.3 to 5.5 g/cm³.

The sheet-form negative electrode was heated in a sintering furnace from room temperature to 900° C. over one hour with flowing a gas mixture of argon and hydrogen in a volume ratio of 99:1 in a flow rate that one tenth of the gas in the furnace was replaced with the gas mixture per one minutes, and sintered at 900° C. for 15 hours. After cooling down to 30° C., the negative electrode was removed from the furnace. In the sintering step at 900° C., the furnace atmosphere contained 20 ppm of oxygen and the humidity was −55° C. in terms of a dew point.

The packing density of the alloy powder after sintering was substantially the same as before sintering.

After sintering, contents of carbon and nitrogen were measured. The alloy contained 0.007 to 0.011% by weight of carbon and 0.012 to 0.015% by weight of nitrogen.

After sintering, the discharge reserve was about 0.03% by weight.

The sheet-form negative electrode having a thickness of 0.3 mm was cut to obtain a ribbon of 41 mm in width and 111 mm in length, which was used for assembling a cell.

A positive electrode was prepared as follows:

As a fibrous nickel porous sheet as a base sheet, Fibel (a trade name) (manufactured by Katayama Special Industries Co., Ltd.) was used. This porous sheet had a thickness of 1.6 mm and a porosity of 96% by volume.

As nickel hydroxide powder, was used nickel hydroxide containing both 1.9% by weight of zinc and 5% by weight of cobalt in the solid solution state and having a height ratio of the main peak around 6 Å to subpeaks around 5, 8 and 10 Å of 0.2 in the pore distribution curve.

As a conductive aid, nickel powder Type 255 having an average particle size of 2.2 µm (manufactured by Inco) and cobalt fine powder having an average particle size of 1.5 µm (manufactured by MHO) were used.

To 100 parts by weight of the nickel hydroxide powder, 11.6 parts by weight of the nickel powder and 4.4 parts by weight of the cobalt powder were added and dry mixed for one hour.

To the mixture, a 2 wt. % aqueous solution of a sodium salt of carboxymethylcellulose (50 parts by weight) and a 60 wt. % dispersion of polytetrafluoroethylene powder (POLYFLON D-1 manufactured by Daikin Industries, Ltd.) (5 parts by weight) were added and kneaded to obtain an active material paste.

In the active material paste contained in a beaker, was dipped a fibrous nickel porous sheet of 50 mm in width and 100 mm in length, a center part of which was depressed in an area having a width of 4 mm in width direction and taped to avoid the filling with the active material. Then, the beaker was stored in a desiccator, and the desiccator was evacuated and returned to an atmospheric pressure, whereby the fibrous nickel porous sheet was filled with the active material paste.

Thereafter, the porous sheet filled with the active material paste was heated and dried at 85° C. for one hour, pressed to a thickness of 0.7 mm and dipped in an aqueous alkali solution containing 30% by weight of potassium hydroxide for 30 minutes. After dipping, the sheet was thoroughly washed with water and again heated and dried at 85° C. for one hour to obtain a sheet-form positive electrode.

Color of the positive electrode was dark brown and its equilibrium electrode potential in the electrolyte solution was 50 mV against a mercury/mercury oxide reference electrode. The residual content of cobalt was 30%, and a resistivity in the thickness direction was 24 Ω.cm.

The sheet-form positive electrode having a thickness of 0.7 mm was cut to obtain a ribbon having a length of 82 mm and a width of 39 mm. To the compressed area from which the tape was removed, a nickel ribbon having a length of 51 mm and a width of 3 mm was spot welded as a collector terminal and lead member, and the positive electrode having the nickel ribbon was used for assembling a cell.

The spot welding was started from a line 0.5 mm apart from the top edge of the positive electrode and made at five points each having a diameter of 1 mm. A total welded area was 3.9 mm².

The charge capacity (theoretical) of the positive electrode plate was 1150 mAh.

As a separator, a grafted polypropylene non-woven fabric (No. 700 manufactured by Scimat Ltd.) having a thickness of 0.13 mm was used after being cut to a length of 250 mm and a width of 43 mm and folded at the center.

The separator was dipped in an electrolyte solution at 45° C. for 3 days, and then the electrolyte solution was subjected to the cyclic voltammetry under the above described conditions. A peak around −0.3 V was only 15 µA/cm². The whole content of nitrogen in the separator was 100 ppm.

The above prepared positive and negative electrodes were laminated and wound with inserting the separator between them to form a spirally wound electrode member as follows:

As a core, a steel rod having a diameter of 3.5 mm which was cut along its axis was used. Between a pair of semicylindrical halves, the folded separator was sandwiched and wound around the core rod by one turn. Then, the negative electrode was inserted between the folded separator and wound by one turn. Thereafter, the positive electrode was positioned on the negative electrode through the separator, and the negative electrode, the separator and the positive electrode were completely wound. The number of turns was about 3.5. The spirally wound electrode member had an outer diameter of 13.2 mm and, on the outermost periphery, the exposed negative electrode.

Using this spirally wound electrode member, the shapability of the negative electrode was evaluated. That is, the once formed electrode member was unwound, and the removed negative electrode was weighed. From a difference of the weight of the negative electrode between before and after the winding, a weight of the fallen alloy powder was calculated. With each alloy, ten electrode members were formed and the amount of the fallen alloy powder was measured. From the averaged amount of the fallen alloy powder, the shapability of the negative electrode was evaluated.

The results are shown in Table 3.

TABLE 3

| Example No. | Average amount of fallen alloy powder (mg) |
|---|---|
| 1 | 3.7 |
| 2 | 2.1 |
| 3 | 2.0 |
| 4 | 3.0 |
| 5 | 5.2 |
| 6 | 3.4 |
| Comp. 1 | 25.3 |
| Comp. 2 | 47.5 |
| Comp. 3 | 13.6 |
| Comp. 4 | 26.5 |
| Comp. 5 | 28.1 |
| Comp. 6 | 11.1 |

With the alloy of the present invention, the amount of the fallen powder is small during winding of the negative electrode and the alloy has good shapability, so that the alloy of the present invention is particularly suitable for the electrode in which the alloy and the support are integrated by sintering.

The spirally wound electrode member was inserted in a cell case made of a nickel-plated iron sheet having an inner diameter of 13.4 mm, and the cell case was filled with 2 ml of a 30 wt. % aqueous solution of potassium hydroxide containing 17 g/l of lithium hydroxide. Then, an opening of the cell case was sealed with a sealing lid to assemble a U3 (AA) size cell.

The structure of the cell is shown in FIG. 7.

The cell of Figure comprises a spirally wound electrode member 4 which consists of a positive electrode 1, a negative electrode 2 and a separator 3, a cell case 5, an annular gasket 6, a sealing lid 7 which consists of a terminal plate 8 and a sealing plate 9, a metal spring 10, a valve body 11, a lead member for the positive electrode 12, an upper insulator 13 and a lower insulator 14.

The positive electrode 1 is the paste type nickel electrode which is formed as above and comprises, as the active material, nickel hydroxide which is converted to nickel oxyhydroxide when charged.

The negative electrode 2 is the hydrogen storage alloy electrode which contains, as the active material, the hydrogen storage alloy.

The separator 3 is made of, for example, a grafted polypropylene non-woven fabric. The positive and negative electrodes are laminated through the separator and wound to form the spirally wound electrode member 4.

The spirally wound electrode 4 is contained in the cell case 5. On the electrode member 4, the insulator 14 is placed.

Before the insertion of the spirally wound electrode member 4 in the cell case 5, the insulator 13 is placed on the bottom of the cell case to prevent the contact between the cell case 5 and the positive electrode 1.

The annular gasket 6 is made of, for example, Nylon 66, and the sealing lid 7 consists of a terminal plate 8 and the sealing plate 9. The opening of the cell case 5 is sealed with the sealing lid 7 and the annular gasket 6.

The terminal plate 8 has an exhaust hole 8a, and the sealing plate 9 has a gas-detection hole 9a. The terminal plate 8 and the sealing plate 9 are fixed by holding the periphery of the terminal plate 8 with a folded-back periphery of the sealing plate 9.

The interior of the sealing lid 7 consisting of the terminal plate 8 and the sealing plate 9 contains the metal spring 10 and the valve body 11.

The cell case 5 is made from a nickel-plated cold rolled steel plate. After the electrode member 4 is inserted in the cell case, a part of the case near the opening is depressed circumferentially to form an inwardly protruded portion 5a, which supports the bottom of the annular gasket 6.

That is, the annular gasket 6 and the sealing lid 7 are placed in the opening of the cell case 5, and the bottom of the annular gasket 6 is supported by the inwardly protruded portion 5a of the cell case 5. Then, the opening edge of the cell case 5 is inwardly bent to pressure contact the annular gasket 6 to the sealing lid 7 so as to seal the opening of the cell case 5.

The positive electrode 1 is electrically connected to the lower part of the sealing plate 9 through the lead member 13 for the positive electrode. As a result, the terminal plate 8 of the sealing lid 7 also acts as a positive electrode terminal. An outer periphery of the negative electrode 2 is pressure contacted to an inner wall of the cell case 5. As a result, the cell case 5 also acts as a negative electrode terminal.

The cell contains, as the electrolyte solution, the 30 wt. % aqueous solution of potassium hydroxide containing 17 g/l of lithium hydroxide.

In this type of the cell, under normal conditions, the valve body 11 closes the gas detection hold 9a by the force of the metal spring 10, whereby the cell interior is maintained in a closed state. If a gas is generated in the cell and an internal pressure of the cell increases, the metal spring is compressed so that a gap is formed between the valve body 11 and the gas detection hole 9a, and the gas is exhausted through the gas detection hole 9a and the exhaust hole 8a, whereby burst of the cell is prevented.

After each of the cells assembled in the Examples and Comparative Examples was kept at 60° C. for 17 hours for activating them, it was charged at 0.1 A for 15 hours and discharged at 0.2 A down to 1.0 V. The charge and discharge were repeated five times to carry out the chemical conversion. The discharge capacity in the fifth discharge was used as a standard capacity of the cell.

The performances of the cell which was subjected to the chemical conversion were evaluated by subjecting it to the high rate discharge test, the low temperature discharge test and the self-discharge test as follows. In each test, after charging the cell with a current of 0.1 A at 20° C., the cell was discharged down to 1.0 V under the test conditions for each test, and the discharge capacity was measured.

In the high rate discharge test, after charging, the cell was discharged at a current of 3.0 A at 20° C. to measure the discharge capacity. In the low temperature discharge test, the discharge capacity was measured at 0° C. or −20° C. In the measurement at 0° C., the charged cell was kept standing at 0° C. for 18 hours and discharged at 0° C. at a current of 1.0 A to measure the discharge capacity. In the measurement at −20° C., the charged cell was kept standing at −20° C. for 18 hours, and discharged at −20° C. at a current of 0.5 A to measure the discharge capacity. In the self-discharge test, the charged cell was kept standing at 20° C. for 30 days and discharged at 20° C. at a current of 0.2 A. Then, a residual capacity was measured. The measured capacity is expressed in terms of a percentage based on the standard capacity of each cell.

Separately, a model cell for measuring the negative electrode capacity was produced as described below, and an amount of electrochemical discharge per one gram of the alloy was measured.

As describe above, the negative electrode having a thickness of 0.3 mm prepared by sintering was cut to a length of 50 mm and a width of 40 mm. to one end of the cut negative electrode, a nickel lead wire was bonded. On both sides of the negative electrode, sintering type positive electrodes to which respective nickel lead wires were bonded and which had the sufficiently larger capacity than the negative electrode were placed. The positive and negative electrodes were dipped in a 30 wt. % aqueous solution of potassium hydroxide containing 17 g/l of lithium hydroxide to set up a model cell.

The model cell was kept standing at 60° C. for 20 hours to activate it and then charged and discharged at 20° C. The model cell was charged at 150 mA for 10 hours and discharged at 100 mA. The discharge was stopped when the negative electrode potential decreased to −0.5 V against the mercury/mercury oxide reference electrode. The charge and discharge cycle was repeated. From the discharge capacity in the fifth cycle, the discharge capacity per one gram of the alloy was calculated.

The results in the cells and the model cells are shown in Table 4.

TABLE 4

| Example No. | Discharge capacity/ g alloy (mAh) | Discharge capacity of cell (%) | | | Capacity retention after stored at 20° C. (%) |
| --- | --- | --- | --- | --- | --- |
| | | High rate discharge | Discharge at 0° C. | Discharge at −20° C. | |
| 1 | 332 | 93.4 | 92.0 | 85.8 | 78 |
| 2 | 383 | 93.8 | 88.9 | 77.5 | 90 |
| 3 | 344 | 94.8 | 90.3 | 83.6 | 83 |
| 4 | 392 | 93.5 | 89.2 | 78.7 | 87 |
| 5 | 341 | 94.7 | 91.1 | 85.3 | 92 |
| 6 | 385 | 94.4 | 90.6 | 84.4 | 89 |
| C. 1 | 236 | 62.9 | 4.0 | 0.3 | 53 |
| C. 2 | 161 | 55.4 | 46.7 | 32.0 | 35 |
| C. 3 | 181 | 51.0 | 39.9 | 3.3 | 61 |
| C. 4 | 253 | 81.8 | 78.0 | 42.6 | 58 |
| C. 5 | 287 | 75.2 | 32.5 | 5.5 | 46 |
| C. 6 | 314 | 84.2 | 78.1 | 18.1 | 29 |

With the hydrogen storage alloys of the present invention, the cells had the large discharge capacity per one gram of the alloy which was larger than 300 mAh, and exhibited the large discharge rates in the high rate discharge or the discharge of low temperature of 0° C. or −20° C. In addition, the cells had the low self-discharge.

In comparison with the cells according to the present invention, the cells in Comparative Examples were insufficient in at least one of the high rate discharge performance, the low temperature discharge performance and the self-discharge performance.

From the above results, it is understood that, to obtain a cell having good properties in total, the atomic contents "a", "b", "c" and "d" of Ni, Zr, Mn and Ti, respectively should satisfy the following conditions:

$a > b > c > d$, $b/a > \frac{1}{2}$, $c/a < 11/20$ and $d/a < 2/5$ and the alloy contains at least one other metal in an atomic content smaller than that of Ti.

EXAMPLE 7

Using the alloy prepared in Example 4, a sheet-form negative electrode having a thickness of 0.25 mm was prepared and sintered in the same manner as in Examples 1-6 and cut to obtain a ribbon having a length of 127 mm and a width of 41 mm, which was used for assembling a cell.

A positive electrode was prepared in the same manner as in Examples 1-6 by cutting a positive electrode sheet having a thickness of 0.65 mm and a depressed portion of 4 mm in width near the center of the sheet in a width direction to a length of 98 mm and a width of 39 mm and spot welding a nickel ribbon having a length of 51 mm and a width of 3 mm. The positive electrode had a charge capacity (theoretical) of 1370 mAh.

As the separator material, the same one as used in Examples 1-6 was used. This was cut to a length of 250 mm and a width of 43 mm and folded at the center.

The positive and negative electrodes were spirally wound through the separator in the same manner as in Examples 1-6 and inserted in the nickel-plated iron cell case having an inner diameter of 13.4 mm. In the cell case, 2.1 ml of a 30 wt. % aqueous solution of potassium hydroxide containing 17 g/l of lithium hydroxide was poured to assemble a U3 (AA) size cell having a weight of 25.5 g.

After activating the cell by keeping it at 60° C. for 17 hours, the cell was charged at 0.1 A for 17 hours and discharged down to 1.0 V at 0.2 A. The charge and discharge were repeated five times to carry out the chemical conversion. The discharge capacity in the fifth discharge was 1330 mAh, which was used as a standard capacity of the cell.

The chemically converted cell was subjected to the high rate discharge test, the low temperature discharge test and the self-discharge test. In each test, after charging the cell at 20° C. at a current of 0.1 A for 17 hours, the cell was discharged down to 1.0 V under the respective test conditions, and the discharge capacity was measured.

In the high rate discharge test, after charging, the cell was discharged at a current of 3.0 A at 20° C. to measure the discharge capacity. In the low temperature discharge test, the discharge capacity was measured at 0° C. or −20° C. In the measurement at 0° C., the charged cell was kept standing at 0° C. for 18 hours and discharged at 0° C. at a current of 1.0 A to measure the discharge capacity. In the measurement at −20° C., the charged cell was kept standing at −20° C. for 18 hours, and discharged at −20° C. at a current of 0.5 A to measure the discharge capacity. In the self-discharge test, the charged cell was kept standing at 20° C. for 30 days and discharged at 20° C. at a current of 0.2 A. Then, a residual capacity was measured. The measured capacity is expressed in terms of a percentage based on the standard capacity of the cell.

The results are shown in Table 5.

TABLE 5

| Example No. | Discharge capacity of cell (%) | | | Capacity retention after stored at 20° C. (%) |
| --- | --- | --- | --- | --- |
| | High rate discharge | Discharge at 0° C. | Discharge at −20° C. | |
| 7 | 91.9 | 86.3 | 74.7 | 82 |

The hydrogen storage alloy cell of Example 7 had a large discharge capacity of 1300 mAh or higher in the U3 size and was excellent in the high rate discharge performance, the low temperature performance and the self-discharge performance. This cell had the energy density of about 63 Wh/kg, namely about 198 Wh/liter, which is much higher than about 51 Wh/kg of a conventional U3 size cell having a discharge capacity of 1100 mAh.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrogen storage alloy comprising Ni, Zr, Mn, Ti and at least one other element and at least two phases including a phase which comprises at least one kind of Laves structure intermetallic compound, wherein when atomic ratios of Ni, Zr, Mn and Ti are "a", "b", "c" and "d", respectively, "a" is larger than "b", "b" is larger than "c", "c" is larger than "d", and "d" is larger than the atomic ratio of at least one other element, and a ratio b/a is larger than ⅜, a ratio c/a is smaller than 11/20 and a ratio d/a is smaller than 2/5.

2. The hydrogen storage alloy according to claim 1, wherein said at least one other element is selected from the group consisting of V, Co, Cr and Mo.

3. An electrode comprising a support and a layer of a hydrogen storage alloy as an active material, wherein at least a surface of said support is made of the same element as an element contained in the largest amount in said alloy.

4. The electrode according to claim 3, wherein said hydrogen storage alloy is a hydrogen storage alloy as claimed in claim 1, and at least a surface of said support is made of nickel.

5. A hydrogen storage alloy cell comprising a negative electrode which comprises a support and a layer comprising a hydrogen storage alloy as claimed in claim 1, a positive electrode, a separator provided between the negative electrode and the positive electrode, and an electrolyte solution which wets the negative and positive electrodes and the separator.

* * * * *